United States Patent [19]

Brimaud

[11] Patent Number: 4,480,725
[45] Date of Patent: Nov. 6, 1984

[54] SPOT TYPE BRAKE WITH FLOATING CALIPER

[75] Inventor: Gilbert Brimaud, Paris, France

[73] Assignee: Valeo, Paris, France

[21] Appl. No.: 359,601

[22] Filed: Mar. 18, 1982

[30] Foreign Application Priority Data

Mar. 25, 1981 [FR] France .................... 81 05957

[51] Int. Cl.³ .................... F16D 51/14; B60T 11/10
[52] U.S. Cl. ............................ 188/76; 188/153 A; 188/365
[58] Field of Search ............. 188/76, 71.7, 72.4, 188/73.2, 73.36, 73.37, 153 A, 365, 18 A, 151 R, 73.46, 73.47; 192/73, 85 AT, 70.14; 277/30

[56] References Cited

U.S. PATENT DOCUMENTS 3,409,106 11/1968 Meier et al. .................. 188/73.37
4,130,186 12/1978 de Gennes ........................ 188/76

FOREIGN PATENT DOCUMENTS 1153949  3/1964  Fed. Rep. of Germany .
1422879  1/1966  France .
2176357 10/1973  France .
2240659  3/1975  France .
2346605 10/1977  France .
1462790  1/1977  United Kingdom .

Primary Examiner—Bruce H. Stoner, Jr.
Assistant Examiner—Robert J. Oberleitner
Attorney, Agent, or Firm—Charles E. Brown

[57] ABSTRACT

A spot type brake having a disc or preferably ring brake member comprises a pair of brake pads on opposite sides of the brake member and a caliper with a hydraulic actuating unit for clamping the brake pads into engagement the brake member along a braking axis. The piston of the hydraulic actuating unit cooperates with a first brake pad and a bearing surface on the caliper cooperates with a second brake pad. The center or area of the bearing surface is circumferentially offset upstream or behind the braking axis relative to the direction of rotation of the brake member but the actuating unit is centered with respect to the first brake pad.

10 Claims, 5 Drawing Figures

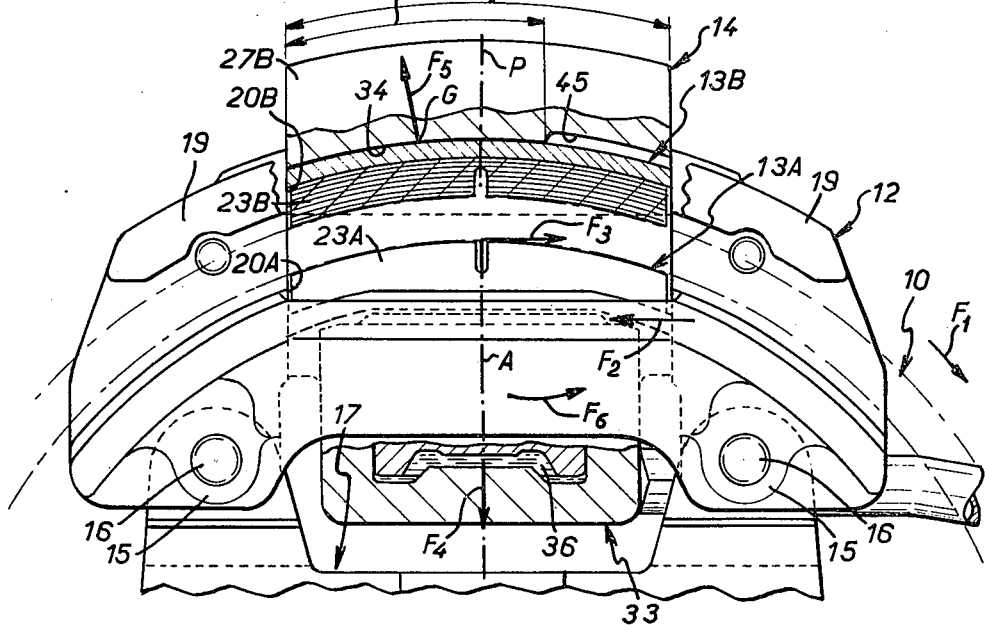
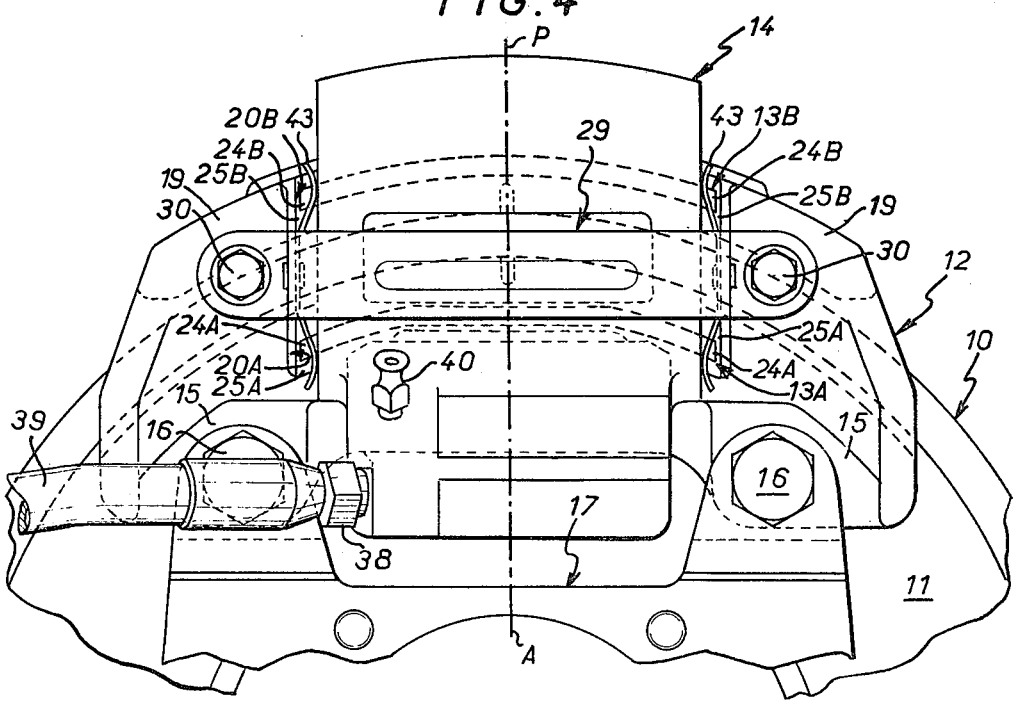

SPOT TYPE BRAKE WITH FLOATING CALIPER

FIELD OF THE INVENTION

The present invention relates generally to spot type brakes, namely for motor vehicles, which comprise a fixed support, a rotary brake member, two brake pads disposed on opposite sides of the brake member, and an operating member for urging the brake pads into contact with the brake member along a generally transverse direction known as the gripping or braking axis.

The present invention relates more particularly to such brakes in which the actuating member is floatingly mounted, i.e., transversely movably mounted with respect to the rotary brake member. The operating member comprises a hydraulic actuating unit on one side of the brake member for urging a first brake pad into engagement with the brake member and a bearing surface on the other side of the brake member which is adapted to cooperate with the second brake pad for urging it into engagement with the brake member.

Such a brake may be a disc brake, i.e., a brake in which the brake member is a generally flat disc and the operating member is a caliper which is mounted for axial movement parallel to the axis of the disc. Preferably, the brake is a so-called crown or ring brake in which the brake member is a generally cylindrical ring and the operating member is also a caliper is mounted for radial movement, parallel to the radial direction of the cylindrical brake member extending through the middle or central areas of the brake pads.

BACKGROUND OF THE INVENTION

One of the problems posed with crown or ring type brakes is how to prevent uneven wear of the friction linings of the brake pads. Generally, such oblique wear of the friction linings is caused by a rocking moment which at least one of the brake shoes is subjected to in the course of operation.

In a crown or ring brake the radially inner brake pad which is adapted to engage the inner surface of the cylindrical brake member is subjected to this rocking moment. During braking the inner brake shoe is subjected to a drag force in the direction of rotation due to its friction contact with the cylindrical brake member and also to a reaction force owing to its being circumferentially supported by the fixed support either directly or indirectly through the caliper at the trailing end relative to the direction of rotation of the brake member.

Owing to the inner pad being convex, the resulting forces produce a rocking moment about an axis perpendicular to the braking axis and parallel to the axis of the cylindrical brake member, which rocking moment causes the circumferentially leading end to bear more against the brake member.

In operation it is found that the wear of the friction pad of the inner brake pad is greater at the circumferentially leading end than the circumferentially trailing end.

Theoretically owing to its being concave, the outer brake pad, which is adapted to cooperate with the outer surface of the brake member, is subjected to no substantial rocking moment. In practice, however, it has been observed that the wear of the friction lining of the outer brake pad is greater at the trailing end than at the leading end. The reason for this is that, in operation, on account of the clearance with respect to the fixed support, for good sliding relative thereto without a risk of jamming, fretting or corrosion whatever the thermal expansion relative to the fixed support, and the inevitable increase in clearance due to the opening of the fixed support caused by braking torque in operation, the caliper tends to follow within the limits of clearance defined above, the tilting of the inner brake pad attendant to oblique wear of the tendency for greater wear at the leading edge, and therefore causes the outer brake pad to bear more through its trailing end than its leading end.

To illustrate the above it is possible to indicate by way of example the angular inclination of the caliper relative to the braking axis may reach an angle of the order of 1°. It follows that the greater wear of the outer brake pad is more than one millimeter, or overall 20% of the thickness of the brake lining material at the trailing end of the outer brake pad.

Thus, in operation, like the inner brake pad, the outer brake pad has a tendency to tilt with respect to the brake member.

Other than the resulting uneven wear of the brake pads, which reduces the service life thereof, the tilting of the brake pads is a source of spurious rubbing between brake operations which untimely wears out the pads.

Such oblique wear of brake pads is also found in disc brakes. In such disc brakes the caliper is fixed and a hydraulic actuating unit is provided at each end thereof, one for controlling the first brake pad and the other for controlling the second brake pad. It has already been proposed to minimize the oblique wear of the brake pads by shifting or offsetting with respect to the central areas of the brake pad the center of area of the brake pad that cooperates with the piston of the corresponding hydraulic actuating unit, which is machined and oriented accordingly.

In practice the center of area of the brake pad is then circumferentially offset with respect to the braking axis of the leading end of the brake pad relative to the direction of rotation of the disc, the bearing surface against which the corresponding hydraulic actuating unit acts being truncated in consequence.

Mere transposition to a floating operating member does not provide a device which gives satisfactory results. For example, with a cylindrical brake member this arrangement produces accelerated wear of the outer brake pad, the angle of inclination of the caliper relative to the braking force axis is accentuated correspondingly.

In French printed patent application No. 2,176,357 which discloses a disc brake with a floating caliper a circumferential offset is provided between the piston of the hydraulic actuating unit and the corresponding (inner) brake pad, and the other (outer) brake pad on the bearing surface side of the caliper.

In practice it is found that such an arrangement is ineffective as a not insubstantial oblique wear of the brake pads has been observed. The reason may be due to the effects of the circumferential offsetting in such an arrangement which may counteract each other.

OBJECT AND SUMMARY OF THE INVENTION

An object of the invention is to provide an arrangement which, on the contrary, tends to minimize in an effective manner the oblique wear of the brake pads used with floating operating members or calipers.

According to the invention there is provided a spot type brake comprising a fixed support, a rotary brake member, two brake pads disposed on opposite sides of the brake member. An operating member is mounted transversely with respect to the brake member and comprises a hydraulic actuating unit on one side of the brake member adapted to urge a first brake pad against the brake member and a bearing surface on the other side of the brake member adapted to cooperate with a second brake pad. The brake is characterized by the barycenter or center of area of the bearing support of the operating member being circumferentially offset with respect to the braking axis, or behind the braking or gripping axis with respect to the direction of rotation of the brake member, whereas the hydraulic actuating unit is not offset with respect to the first brake pad.

Owing to this arrangement the operating member is subjected to a rocking moment which is opposed to that caused by any possible tilting of the inner brake pad and counteracts the same and therefore minimizes or even eliminates the effects on the outer brake pad instead of accentuating them.

Indeed, during braking the operating member is subjected to two transverse forces, one of the forces on the inner brake pad side which is due to the hydraulic pressure developed in the corresponding hydraulic actuating unit and the other force on the outer brake pad which is the reaction force produced by bearing against the outer brake pad.

The outer brake pad may be considered to provide a fixed bearing member for the operating member, the direction of the reaction force in contact therewith may be deemed to be fixed. This is not so for the force due to the hydraulic fluid in the hydraulic actuating unit, which fluid exerts its effects on a part of the operating member which may be deemed to be free for movement.

Further, the force due to the hydraulic fluid tends to come into alignment with the reaction force due to the bearing against the outer brake pad and on account of the location of the same in accordance with the main feature of the invention a rocking moment is applied to the operating member from the circumferentially leading end to the circumferentially trailing end of the outer brake pad, and therefore a rocking moment in the opposite direction to rocking moment to which the operating member is subjected because of the oblique wear of the inner brake pad.

The oblique wear of the outer brake pad is thus minimized or even eliminated and such is advantageously the case, at least to some extent, for the inner brake pad.

Moreover, the piston of the actuating unit may advantageously be an ordinary piston, that is, a piston without any special means for offsetting its bearing surface on the inner brake pad which avoids having to ensure a predetermined orientation relative to the inner brake pad.

According to another embodiment of the invention the center of area of the bearing surface of the operating member is also offset perpendicular to the braking axis and perpendicular to the free edge of the rotary brake member and is located on the side of the braking axis relatively remote from the free edge.

For reasons similar to those brought out above, the oblique wear which the outer brake pad may be subjected to transversely owing to the opening of the operating member under the force due to the braking action, is also advantageously minimized or even eliminated which is likewise the case for the inner brake pad.

These and other features and advantages of the invention will become apparent from the description which follows, given by way of example, with reference to the accompanying diagrammatic drawings.

BRIEF DESCRIPTION OF THE DRAWINGS

FIG. 3 is a partial elevational view, cut away in parts, taken in the direction of arrow III in FIG. 1, one of the components being removed for the sake of clarity;

FIG. 4 is another partial elevational view taken in the direction of arrow IV in FIG. 1.

DESCRIPTION OF THE PREFERRED EMBODIMENTS

The drawings illustrate by way of example a ring or crown type spot brake, that is, a brake having a generally cylindrical ring brake member 10 which is axially elongate. The cylindrical brake member 10 is carried by a flange 11 by which it may be secured to the shaft to be braked (not shown). It is for example a motor vehicle brake.

As is known per se, such a ring spot brake comprises a fixed support 12, described in greater detail below, two brake pads 13A, 13B being disposed on opposite sides of the brake member. A first or inner brake pad 13A cooperates with the inner surface of the brake member 10 and the second or outer brake member 13B cooperates with the outer surface of the brake member 10. An operating member or caliper 14 is cooperable with the brake pads 13A, 13B to urge then in a direction generally transversely, here generally radially, with respect to the brake member along an axis referred to as the gripping or braking axis A through which the force is deemed to be applied by the brake pads for gripping or braking the brake member.

Figure 1:
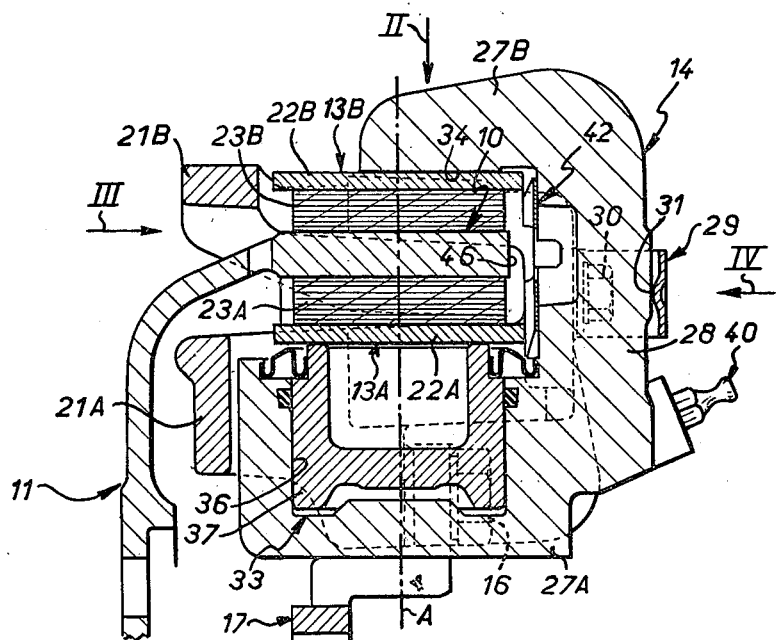
FIG. 1 is a longitudinal section view taken on the line I—I in FIG. 2.
Figure 2:
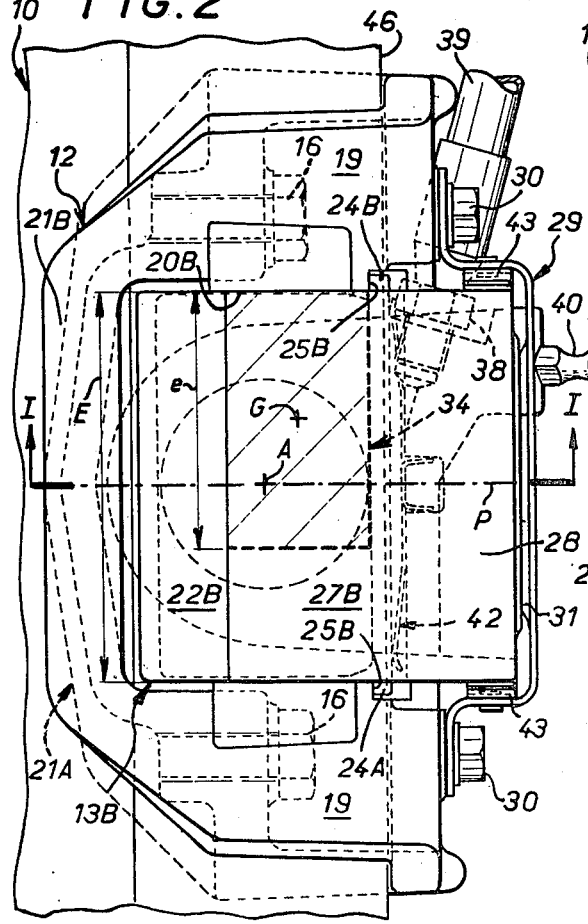
FIG. 2 is a plan view taken in the direction of arrow II in FIG. 1.
Figure 5:
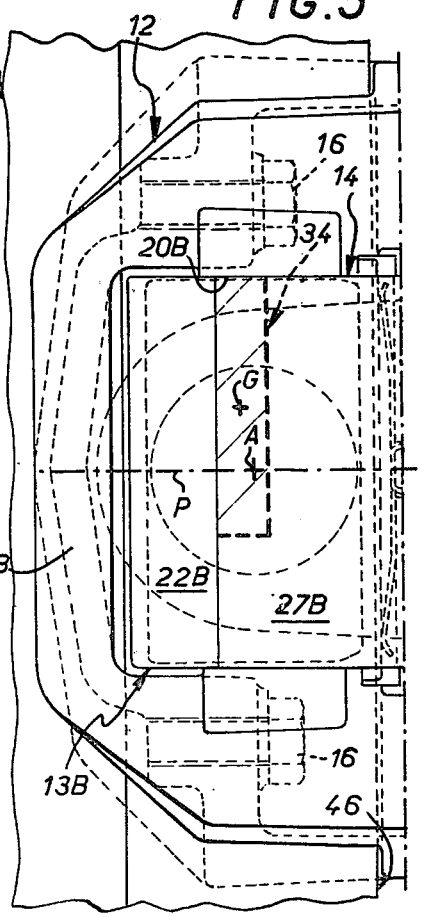
FIG. 5 is a partial plan view similar to that of FIG. 2 relative to a modified embodiment.

The braking axis A extends through the central area of each of the brake pads 13A, 13B and is represented by phantom line in FIGS. 1, 3 and 4 and a cross in FIGS. 2 and 5.

In the illustrated embodiments the brake is generally symmetrical with respect to an axial plane P extending through the braking axis A. The axial plane P of symmetry is represented by a phantom line P in FIGS. 2-5.

In the illustrated embodiments the fixed support 12 comprises two lugs 15 disposed on opposite sides of the axial plane P of symmetry and through which screws 16 secure the fixed support to a flange 17. As is known per se, the flange 17 is in turn secured to a fixed support member such as the stub axle or axle tube of the wheel to be braked when in use on a motor vehicle, or the flange is integrally formed with such a fixed support member.

In continuity with the lugs 15 the fixed support 12 comprises parallel to the axial plane P of symmetry two legs 19. The legs 19 are each generally C-shaped to be received axially on and straddling the cylindrical brake member 10 without coming into contact therewith. Both of the legs 19 define openings or housings 20A, 20B adapted to provide circumferential abutment for the brake pads 13A, 13B at each circumferential end thereof.

Inside the brake member legs 19 of the fixed support 12 are connected to each other, on the flange side 11, a generally handle-shaped connecting bar 21A which thus passes around the operating member or caliper 14.

The same applies to the outside of the brake member 10, the legs 19 of the fixed support are connected to each other in vertical alignment with the connecting bar 21A with a generally handle-shaped connecting bar 21B which thus passes around the outer brake pad 13B.

As is known, each brake pad 13A, 13B comprises a backing plate 22A, 22B on which a friction lining 23A, 23B is secured, for example, by adhesive or glue. The backing plates 22A, 22B have lateral projections 24A, 24B which under the action of resilient means, described below, bear axially against transverse shoulders 25A, 25B provided on the legs 19 of the fixed support 12.

Likewise, as is known per se, the operating member 14 is mounted for transverse movement with respect to the brake member 10 and therefore radially of the cylindrical brake member in this embodiment, along the braking axis A.

In the illustrated embodiment the operating member 14 is generally C-shaped to be axially received around the subassembly comprising the brake member 10 and the brake pads 13A, 13B. The operating member 14 comprises two arms 27A, 27B connected by an intermediate or bight portion 28. The operating member 14 which is radially guided by the legs of the fixed support 12 is axially retained by a handle-shaped connecting bar 29 which is in contact with the intermediate portion 28 of the operating member 14 at the back of the latter and which is secured laterally by screws 30 to the legs 19 of the fixed support. For contact with the intermediate portion 28 of the operating member 14 the connecting bar 29 has an elongate transversely extending bead 31. In addition to the fact that the operating member 14 is mounted for radial displacement it is also pivotally mounted in contact with the connecting bar 29 which ensures axial retention.

For braking the brake member 10 by urging the brake pads 13A, 13B in the direction of the braking axis A, the operating member further comprises on the inner side of the brake member 10 a hydraulic actuating unit 33 which is formed in the arm 27A and which is adapted to cooperate with the inner brake pad 13A and on the outer side of the brake member a bearing surface 34 which is formed on the arm 27B and which is adapted to cooperate with the outer brake pad 13B.

As is known per se, the hydraulic actuating unit 33 comprises a blind bore or cylinder 36 in arm 27A of the operating member 14 in which the piston 37 is slidably mounted to act on the inner brake pad 13A and which is adapted to be connected to a source of pressurized fluid (not shown) through a connector 38 and a tube 39. A bleed port 40 is also provided.

The operating member 14 acts as a support for resilient means, referred to above, axially urging the brake pads 13A, 13B for maintaining the lateral projections 24A, 24B of the braking plates 22A, 22B against the corresponding transverse shoulders 25A, 25B on the legs 19 of the fixed support 12. As shown, the resilient means comprise a leaf spring 42 bearing against the intermediate portion 28 of the operating member 14. Also, for laterally stabilizing the operating member 14, the connecting bar 29 which ensures axial retention laterally carries leaf springs 43.

The foregoing features are known per se and therefore need not be described in greater detail.

Likewise the operation of the brake is well known and therefore will be described only briefly. When the pressurized hydraulic fluid is conveyed into the blind bore 39 in the operating member 14, the piston 37 urges the inner brake pad 22A against the inner surface of the brake member 10 and the operating member 14 transmits the corresponding force to the outer brake pad 13B which is thus also urged against the outer surface of the brake member 10 which is then clamped or braked. When the pressure in the bore 36 is relieved the brake member 10 is unclamped.

In practice, during braking, and assuming the direction of rotation of the brake member 10 (shown in phantom lines) is that indicated by arrow F1 in FIG. 3, the operating member 14 is normally subjected to a tendency to rock in the direction of arrow F1 relative to the brake axis F1.

In fact, as brought out above, the inner brake pad 13A is circumferentially in abutment with the fixed support 12 at its trailing end relative to the direction of rotation of the brake member 10 and thereby is subjected to a reaction force in the direction of arrow F2 in FIG. 3. The inner brake pad 13A is therefore subjected to a tangential drag force in the direction of arrow F3 in FIG. 3 and owing to its convex configuration relative to the brake member 10 which produces a transverse distance between these forces, it is subjected to a rocking moment in the direction of arrow F1. But because of the clearance with respect to the fixed support 12, the operating member 14 has the tendency to follow the rocking of the inner brake pad 13A.

In order to counteract this rocking, only the center of area of barycenter G of the bearing surface 34 of the operating member 14 through which the operating member is in contact with the outer brake pad 13B is circumferentially offset with respect to the braking axis A by being located upstream or behind the braking axis relative to the direction of rotation of the brake member 10, but no circumferential offset is provided between the hydraulic actuating unit 33 and more particularly the piston 37 thereof and the inner brake pad 13A, in other words they are centered with respect to each other.

In practice, in the illustrated embodiment, the bearing surface 34 of the operating member 14 has a reduced circumferential extent e with respect to the circumferential extent E of the main part of the operating member 14, namely, that of the outer arm 27A between the legs 19 of the fixed support 12. In other words, the outer arm 27B of the operating member 14 comprises on its surface facing the outer brake pad 13B to the downstream side relative to the direction of rotation of the braking member 10, a recess 45, best seen in FIG. 3, which limits the extent along which the bearing surface 34 is adapted to cooperate with the outer brake pad 13B and which may preferably be formed in the foundry.

For the sake of improved clarity, the bearing surface 34 is shown hatched in FIG. 2. It has in general a rectangular contour in plan view and its center of area or barycenter G is at the intersection of its diagonals (not shown).

During braking the operating member 14 is subjected generally to two forces. One of the forces, the actuating force F4 is due to the action of the pressurized fluid against the end of the blind bore or cylinder 36 and acts substantially radially along the braking axis A. The other force, the reaction force, F4 due to the outer arm 27B of the operating member 14 bearing against the outer brake pad 13B also acts radially perpendicular to the braking plate 22B of the outer brake pad at the corresponding center of area G.

The reaction force F5 is exerted at a fixed point of the operating member 14 as it corresponds to the bearing of the operating member whereas the actuating force F4 is exerted at a variable point on the operating member 14. The actuating force F4 therefore tends to be in alignment with the reaction force F5 and there results, as regards the operating member 14, a tendency to rock along arrow F6 in FIG. 3, opposite to the operating member's tendency to rock caused by the rocking moment to which the inner brake pad 3A is subjected.

These two rocking tendencies counteract each other and the operating member 14 remains in its radial position. This produces a minimization or even an elimination of the oblique wear which the friction linings 23A, 23B of the brake pads 13A, 13B are subjected to at the circumferentially leading end of the inner brake pad 13A and at the circumferentially trailing end of the outer brake pad 13B.

In the illustrated embodiment the circumferential extent e of the bearing surface 34 is between ½ and ⅔ of the circumferential extent E of the corresponding part of the operating member 14. These numerical values are given by way of example and should not be taken as restrictive.

According to the modified embodiment of FIG. 5, the center of area G of the bearing surface 34 of the operating member 14 is not only circumferentially offset with respect to the braking axis A but also offset perpendicularly to the braking axis A and in a direction perpendicular to the free edge 46 of the brake member 10 (and therefore axially in a ring spot brake) and is situated on the side of the braking axis A relatively remote from the free edge 46.

This complementary arrangement advantageously permits the minimization or even the elimination of oblique wear of the lining material 23A, 23B of the brake pads 13A, 13B transversely, i.e., axially, owing to the tendency of the operating member 14 to open up during braking.

The present invention is not limited to the illustrated and described embodiments but encompasses all variations, modifications and alternatives which will be understood to those skilled in the art, without departing from the scope of the invention.

Further, the field of the invention is not limited to cylindrical brake members but includes disc brake members. In the latter case the transverse direction with respect to the brake member is the axial direction and not the radial direction and the direction perpendicular to the braking axis and to the free edge of the brake member is a radial direction and not an axial direction.

In any event the piston of the hydraulic actuating unit may be an ordinary piston, requiring no particular machining for its cooperation with the inner brake member, and therefore may have any angular orientation inside the blind bore or cylinder in the operating member.

What is claimed is:

1. A spot type crown or ring brake, said brake comprising a fixed support, a rotary cylindrical brake member having inner and outer braking surfaces, inner and outer brake pads disposed respectively radially inwardly and outwardly of said brake member, an operating member mounted for transverse movement relative to said brake member, said operating member including hydraulic actuating means for urging said inner brake pad along a generally transverse braking axis into operative engagement with said inner braking surface of said brake member and a bearing surface for urging said outer brake pad into operative engagement with said outer braking surface of said brake member, the center of area of said bearing surface being circumferentially offset relative to said braking axis and located behind said braking axis relative to the direction of rotation of said brake member, and said hydraulic actuating means being centered with respect to said inner brake pad.

2. The brake of claim 1, wherein the circumferential extent of said bearing surface is smaller than the circumferential extent of the cooperable adjacent part of said operating member.

3. The brake of claim 2, wherein said circumferential extent of said bearing surface of said operating member is between ½ and ⅔ of the circumferential extent of the cooperable adjacent part of said operating member.

4. The brake of claim 1, wherein said cylindrical brake member has a free edge, said center of area of said bearing surface of said operating member is also offset with respect to said braking axis and perpendicular to said free edge of said brake member, and is located on the side of said braking axis relatively remote from said free edge.

5. The brake of claim 2, wherein said cylindrical brake member has a free edge, said center of area of said bearing surface of said operating member is also offset with respect to said braking axis and perpendicular to said free edge of said brake member and is located on the side of said braking axis relatively remote from said free edge.

6. The brake of claim 3, wherein said cylindrical brake member has a free edge, said center of area of said bearing surface of said operating member is also offset with respect to said braking axis and perpendicular to said free edge of said brake member and is located on the side of said braking axis relatively remote from said free edge.

7. The brake of claim 1, wherein said operating member is generally a C-shaped caliper having said hydraulic actuating means in one arm thereof and said bearing surface formed on an opposite arm of said caliper.

8. The brake of claim 4, wherein said operating member is generally a C-shaped caliper having said hydraulic actuating means in one arm thereof and said bearing surface formed on an opposite arm of said caliper.

9. The brake of claim 1, further including means for radially rockably mounting said caliper on said support member.

10. The brake of claim 4, further including means for radially rockably mounting said caliper on said support member.

* * * * *